INVENTOR.
HERBERT H. KOUNS

BY
WOOD, HERRON & EVANS

Nov. 8, 1966  H. H. KOUNS  3,283,726
CONSTRUCTION FOR PUMP/MOTOR DEVICES
Filed Dec. 14, 1964  2 Sheets-Sheet 2
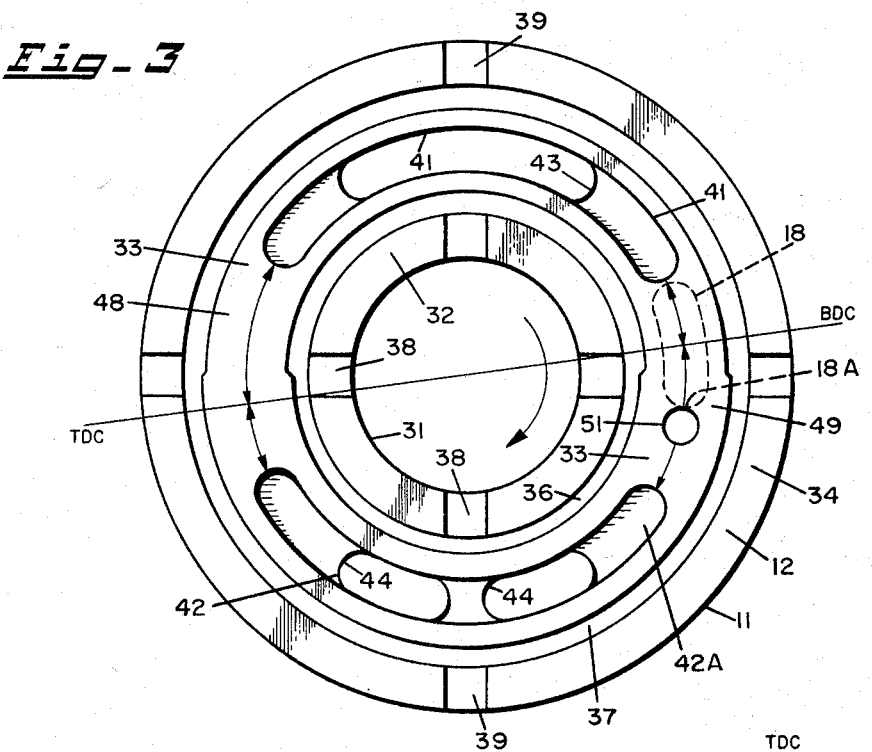
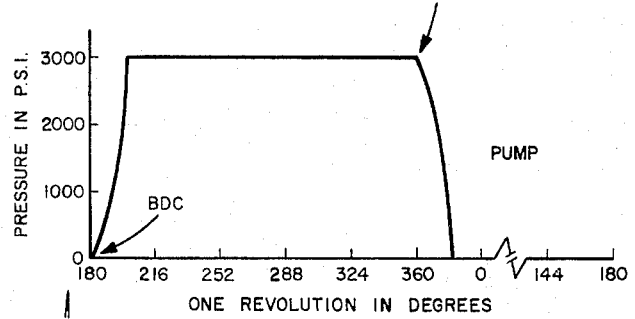
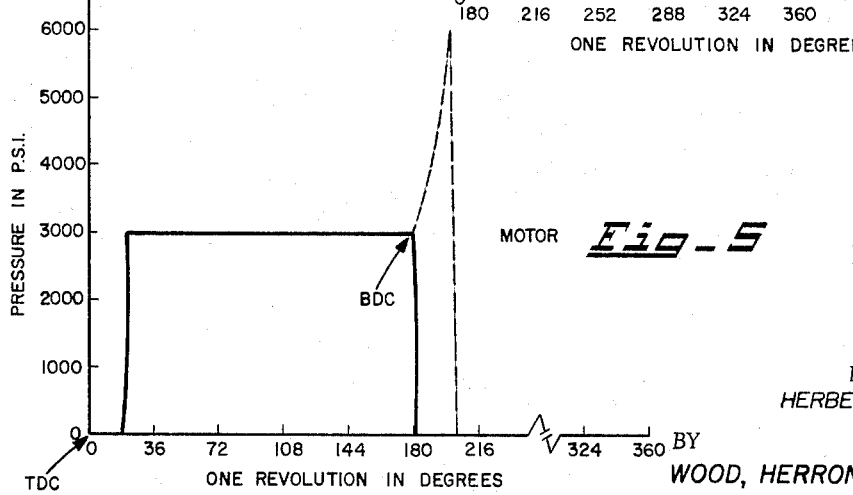
INVENTOR.
HERBERT H. KOUNS
BY
WOOD, HERRON & EVANS United States Patent Office 3,283,726
Patented Nov. 8, 1966

3,283,726
CONSTRUCTION FOR PUMP/MOTOR DEVICES
Herbert H. Kouns, Camarillo, Calif., assignor to American Brake Shoe Company, New York, N.Y., a corporation of Delaware
Filed Dec. 14, 1964, Ser. No. 418,095
3 Claims. (Cl. 103—162)

This invention relates to improvements in hydraulic fluid pressure energy translating devices of the axial piston type which can be used alternately as pumps or motors.

Hydraulic pump/motor devices are used in applications where weight is a critical factor. For example, they are employed in auxiliary power units in aircraft in combination with an electric motor/generator. In such use, under certain conditions of aircraft operation, hydraulic fluid under pressure is supplied to the hydraulic pump/motor to cause the same to operate as a hydraulic motor and thereby drive the electric motor/generator as a generator to produce electric power. Under other conditions of aircraft operation, the hydraulic pump/motor is driven by the electric motor/generator so that the hydraulic pump/motor is operated as a pump and provides fluid under pressure to hydraulic gear. The efficiencies arising from such dual functionality are obvious.

Generally speaking, any hydraulic fluid pressure energy translating device can be operated as a pump or motor depending upon whether fluid pressure energy or mechanical motion constitutes the input to it. However, in the past if a hydraulic fluid pressure energy translating device of the axial piston type were designed for greatest operating efficiency as a pump it would necessarily operate relatively poorly as a motor. The reverse was also true.

In particular, the provision of means for the so-called "precompression" of fluid is highly desirable in an axial piston pump, but is undesirable in an axial piston motor. By "precompression" is meant the mechanical application of pressure by the pump upon the hydraulic liquid in each of the piston chambers or cylinders as the latter are moved from the position in which they have the greatest volumetric capacity to the position in which communication is established between them and the outlet or pressure port of the pump. An axial piston pump equipped with precompression means will display better operating characteristics than a pump which is not equipped with the precompression means, but when a pump equipped with the precompression means is operated as a motor it will, because of the presence of the precompression feature, operate with considerably less efficiency than a hydraulic unit which was designed to operate as a motor and, therefore, does not include the precompression feature.

A principal object of this invention is to provide a hydraulic pump/motor device which, when the device is being operated as a pump, establishes such precompression of hydraulic fluid in the cylinder barrel, but which, when operated as a motor, operates without precompression.

Another object of the invention is to provide a hydraulic pump/motor having fluid precompression means which are automatically rendered operative whenever the device is being run as a pump but which are automatically decommissioned whenever the unit is being run as a motor.

Another object of the invention is to provide a hydraulic pump/motor device which will operate more effectively and silently both as a pump and as a motor.

In broad terms, this invention contemplates a hydraulic pump/motor of the axial piston type having a cylinder barrel containing a number of pistons in piston chambers, a valve surface presenting an inlet port and an outlet port which communicate sequentially with the piston chambers as the cylinder barrel is rotated, the valve surface having sealing surfaces for sealing the adjacent ends of the piston chambers when the same are between said ports, a compression venting port in said valve surface positioned to communicate with the piston chambers when the latter are moving from the position of maximum fluid volume toward the outlet port, and means including a fluid pressure operated valve for connecting said compression venting port to said outlet port only when the said pump/motor is being operated as a motor.

The invention can best be further described by reference to the accompanying drawings in which:

FIGURE 3 is a front elevation of the port plate of a hydraulic pump/motor in accordance with this invention showing the preferred positions of the inlet, outlet and compression venting ports therein;

Figure 2:
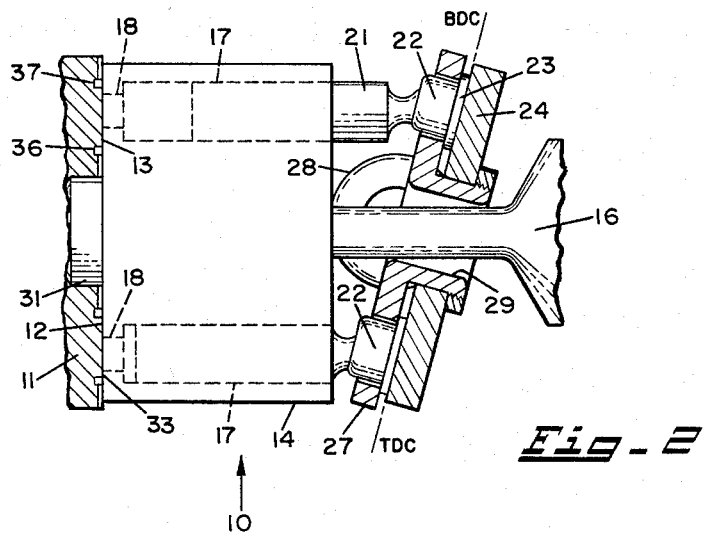
FIGURE 2 is a fragmentary side elevation of the operating elements of a conventional hydraulic pump/motor combination including the precompression means and showing particularly the port plate, cylinder barrel, pistons, swash plate and shaft thereof.

FIGURE 4 is a graph illustrating a typical change in piston chamber pressure as a function of the angular position of the piston chamber in a hydraulic pump/motor of the type shown in FIGURES 2 and 3 when operated as a pump, and FIGURE 5 is a graph showing a typical change in piston chamber pressure as a function of angular position in a hydraulic pump/motor incorporating this invention when the device is being operated as a motor, and also illustrates in dotted lines the overrise in piston chamber pressure which could occur if compression occurred in operation as a motor.

Referring now in greater detail to the drawings, the numeral 10 in FIGURE 2 designates generally the operating elements of a hydraulic pump/motor. These elements include a port or valve plate 11 having a generally planar valve and bearing surface 12 which engages the end surface 13 of a cylinder barrel 14.

The cylinder barrel 14 is connected to an operating shaft 16. The shaft 16 is suitably connected to an electric motor/generator, not shown, which, when the hydraulic pump/motor is being operated as a pump, supplies rotational energy to the shaft 16 to rotate the barrel 14, and which, when the pump/motor is being operated as a motor, is supplied with rotational energy through the shaft 16 from the hydraulic pump/motor. Shaft 16 is journalled in bearings contained in the pump/motor housing. These may be conventional and are not shown.

The cylinder barrel 14 is provided with a plurality of cylinders or piston chambers indicated by the dotted lines at 17. These cylinders are parallel to the axis of operating shaft 16 and are uniformly spaced around the axis. A sausage-shaped cylinder port 18 extends from the inner end of each cylinder 17 to the end surface 13 of the cylinder barrel. Sausage-shaped ports 18 are shown in FIG. 2, and in FIG. 3 one of them is superimposed in dotted lines upon the port plate 11.

In each cylinder 17 there is received a reciprocable piston 21. The outer end of each piston 21 (i.e. the righthand end in FIGURE 2) is provided with a piston shoe 22 of a known type which is universally mounted to the piston. The piston shoes 22 each have planar surfaces 23 which ride upon the cam plate 24. A hold-down plate 27 which is rotatably mounted to the cam plate at 29 holds the shoes 23 in engagement with the cam plate 24.

The port plate 11 contains ports which communicate intermittently with the sausage-shaped ports 18 in the cylinder barrel 14 as the latter rotates. The port plate 11 is preferably comprised of a separate plate which is secured to the pump/motor body, not shown, but it may be formed by the end body member.

A preferred port plate 11 of a hydraulic pump/motor in accordance with this invention is shown in front elevation in FIGURE 3. The plate 11 is generally circular and has a central opening 31 through which the operating shaft 16 of the pump passes. The valve and bearing surface 12 of the port plate comprises an annular inner bearing surface portion 32, an intermediate port and bearing surface portion 33, and an outer bearing surface portion 34, these surface portions 32–34 being separated from each other by grooves 36 and 37. Radial grooves 38 extend across the inner bearing surface portion 32 between the central opening 31 and the groove 36, and other radial grooves 39 extend across the outer bearing surface portion 34 from groove 37 to the periphery of the port plate 11.

An inlet port 41 and an outlet port 42 are formed at spaced positions in the intermediate port and bearing surface 33 of the port plate 11. The inlet port 41 extends through the port plate (i.e. into the plane of the sheet in FIGURE 3) toward an opening 43 on the opposite side of the plate, while the outlet port 42 extends rearwardly toward a pair of exit openings 44, 44.

When the barrel 14 rotates, the pistons 21 reciprocate by reason of the angulation of the cam plate 24, and this movement sinusoidally varies the fluid volume of the cylinders and, of course, as the cylinders 17 are rotated each of them passes through a position (BDC) in which the piston 21 therein is withdrawn to its maximum position in which the volumetric capacity of the cylinder is greatest and a position (TDC) in which the piston 17 is at its maximum distance into the cylinder and the cylinder has its minimum volumetric capacity. These positions are 180° apart.

In FIGURE 2 of the drawings, the piston at the top of the view is in the bottom dead center position and the piston at the bottom of the view is in the top dead center position. In this figure, a dot-dash line BDC–TDC is shown which extends between the centers of the bottom and top dead center positions. This line BDC–TDC is superimposed upon FIGS. 1 and 3 to indicate the bottom and top dead center positions of the pistons with respect to the various ports in the port plate.

Between the respective adjacent ends of the inlet and outlet ports 41 and 42 in the port plate there are sealing areas 48 and 49. The TDC end of line BDC–TDC extends across sealing area 48, while the BDC end extends across sealing area 49, so that neither intersects the ports 41 or 42. The separation between the right end of the inlet port 41 and the line at BDC is designated by the angular dimension B in FIGURES 1 and 3, and the separation between the BDC line and the right end of the outlet port 42 is designated by angular dimension A. Correspondingly, the separation between the line at TDC and the left end of the inlet port 41 is designated by A, and the separation between the left end of the outlet port 42 and the line at TDC is designated by B.

A compression venting port 51 is formed in the intermediate port surface 33 of the port plate 11 approximately half-way between the bottom dead center line (BDC) and the right end of the outlet port 42.

Figure 1:
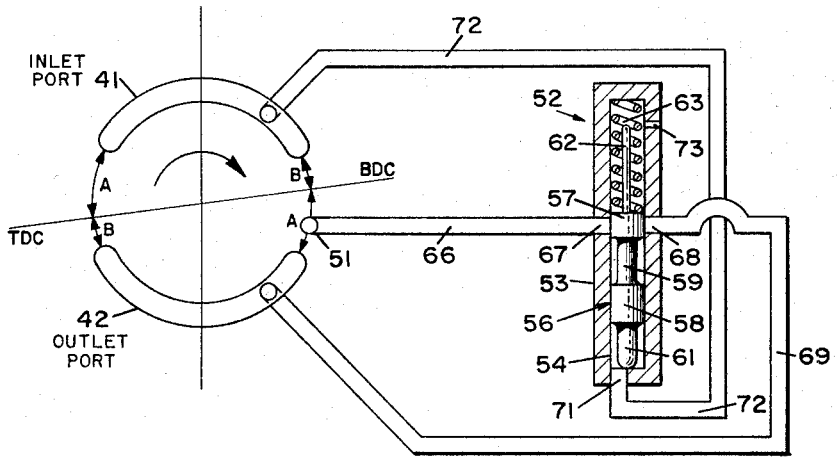
FIGURE 1 is a schematic view of the valve ports in a port plate of an axial piston hydraulic pump/motor equipped with structure in accordance with this invention, and illustrates a preferred form of compression venting valve and the connections thereof to the inlet port, the outlet port and the compression venting port.

As shown schematically in FIGURE 1, the compression venting port 51 is connected to a fluid pressure operated valve 52 of the shifting spool type. This valve 52 has a body 53, which may be integral with the pump/motor body, and contains a bore 54. A spool 56 is slidable in bore 54, and this spool 56 has a pair of spaced lands 57 and 58 which are separated by a circumferential groove 59. Stops 61 and 62 may be formed at the lower end upper ends of spool 56 respectively to limit the movement thereof in bore 54. Biasing means such as a coil spring 63 urge the spool toward the position shown in FIGURE 1.

The compression venting port 51 of the port plate is connected by a line 66 to a port 67 in body 53 of the valve 52. This port 67 is closed to the flow of fluid therethrough by land 57 of the spool when the spool is in the position shown in FIGURE 1. The spool assumes this position when the force of spring 63 exceeds the fluid force to be described which is applied to the lower face of land 58. Another port 68 which may be diametrically opposite port 67 in body 53 is connected by a line 69 to the outlet port 42 of the port plate. Port 68 is closed by land 57 when the spool is in the position shown in FIGURE 1.

A third port 71 opens through the body 53 of the valve 52 into the chamber below land 58 and is connected by a line 72 to the inlet port 41 of the pump/motor. The spring chamber in the valve 52, i.e. the portion of bore 54 above land 57 is preferably vented to a fluid tank or reservoir, not shown, through a port 73.

When the unit functions as a hydraulic pump, rotational energy is supplied to the shaft 16 by the electric motor/generator which is electrically energized and functions as a prime mover to drive the cylinder barrel 14 in a clockwise direction, as indicated by the arrows in FIGURES 1 and 3 of the drawings. When the cylinder barrel is so driven the cylinders 17 and their sausage-shaped ports 18 are, of course, rotated around the axis of the shaft 16 and the ports 18 are caused to register sequentially with the ports and sealing surfaces of the port plate 11.

The operation of the unit can best be understood if a complete cycle of operation of only one of the cylinders 17, its piston 21 and its sausage-shaped port 18 is described and this may best be done by first referring to FIGURE 3 of the drawings. In FIGURE 3 of the drawings, a sausage-shaped port 18 of a cylinder 17 is superimposed in dotted lines on the port plate 11 at its bottom dead center position in which the line at BDC bisects the port 18. When the port 18 is in this bottom dead center position, it and consequently its cylinder 17 are sealed from the port 41 and the cylinder 17 is in the position of maximum cylinder displacement, i.e., its volumetric capacity is the greatest. As the cylinder 17 moves past the point of maximum cylinder volume, i.e. past bottom dead center, its volume in which the fluid is contained begins to diminish, but the fluid contained in that volume is not released until the cylinder comes into communication with the outlet or high pressure port 42 since spring 63 holds the spool 56 in valve closing position, and there is no connection between the compression venting port 51 and the outlet port 42. Thus, the pressure on the fluid in the cylinder is increase as the cylinder is rotated from the bottom dead center position to the position at which the leading edge 18A of the port 18 begins to overlap the edge 42A of the outlet port 42. In a pump, the angular distance, corresponding to dimension A adjacent the line at BDC, is known as the precompression region because the fluid in the cylinder as it moves across that region is placed under pressure before the port 18 is brought into communication with the outlet port 42 and pressure surge from the outlet port 42 into the cylinder 17 is reduced or eliminated.

Precompression is desirable in a pump because it tends to equalize the pressure of the fluid in the cylinders with that at the outlet port under load conditions as described above, thus reducing large instantaneous increases of the pressure of the fluid in the cylinders and the consequent mechanical shock to the parts of the pump and accompanying noises.

Fluid is displaced from the cylinders as the volume thereof continues to diminsh while they move across the outlet port 42 toward the top dead center position. Insignificant further compression of the fluid remaining in the cylinder may occur as the cylinder passes out of communication with the outlet port 42 and is closed by the sealing zone 48, approaching the top dead center line. When the cylinder is in the top dead center position, its volumetric capacity is at its minimum and its contents are under high pressure, as the cylinder travels past the top dead center position and while its port 18 remains sealed by the sealing area 48 the volumetric capacity of the cylinder is increased slightly to reduce gradually the pressure on the liquid in the cylinder and the accompanying strains on parts of the pump.

As previously stated, precompression of fluid within the cylinders prior to the point at which the cylinders come into communication with the outlet port is desirable in a pump. However, precompression is distinctly disadvantageous when the pump/motor is operated as a motor. Under these circumstances, liquid is supplied to the inlet port 41 under pressure. This liquid under pressure causes the barrel to rotate in the direction of expanding cylinder volume, or clockwise in FIGURES 1 and 3. However, because angular separation A exceeds separation B, fluid in the cylinders would be compressed, if precompression were in effect, to a pressure well above the low pressure at the outlet port 42 as the cylinders approach the latter. The effect of precompression on piston cylinder pressure in a motor is indicated by the dotted line in FIGURE 5. If fluid at the inlet pressure were further compressed in the precompression area, its pressure might rise to an excessively high peak level; for example, as illustrated in FIGURE 5, it might rise from an inlet port pressue of say 3,000 p.s.i. up to 6,000 p.s.i. or higher between the bottom dead center line (corresponding to the position of 180° in the FIGURE 5) and the entrance to the outlet port 42 (corresponding to an angular position of about 205° in FIGURE 6). Such extreme pressures resulting from precompression in motor operation would not only cause noisy operation, it might be so high as to physically damage the motor or at least cause excessive wear.

The prevent invention automatically decommissions the precompression means when the present pump/motor is operated as a motor. This is done by opening the pressure responsive valve 52. When the unit is being operated as a motor, the pressure at the inlet port 41 will exceed that at the outlet port 42. The pressure at port 41 is applied through line 72 to the lower end of spool 56, thereby lifting the spool against the force of spring 63 and establishing communication between the precompression port 51 and the outlet port 42 through lines 66 and 69. When the precompression valve is thus opened, pressure at the precompression port 51 is equalized with the pressure at the outlet port, so that no substantial pressure change or precompression occurs. The excessively high pressures which would otherwise arise by precompression are avoided. Motor operation is quieter, blow-by is relieved, and wear is reduced. Because of such operation, pressure at the precompression port could be said to be "dumped" to the outlet port under these conditions.

The precompression valve 52 is automatically closed when the unit is operated as a pump, so as to provide for precompression. Under these circumstances the pressure at the inlet port 41 is lower than the pressure at the outlet port 42, and the force of spring 63 closes the precompression valve 52, thereby isolating the precompression port 51 from the outlet port 42 and permitting precompression to establish an increase in pressure between the two ports.

The precompression port 51 is desirably spaced from the bottom dead center line by approximately the angular distance B, so that the pressure at the precompression port will approximately equal the pressure at the inlet port 41. The separation of the precompression port 51 from the right end of the outlet port 42 should preferably just slightly exceed the daimeter of the bores 18, so that no bore 18 will provide communication between the outlet port and the precompression port 51 as it moves across the sealing region 49 between the two ports.

It will be seen that existing pump/motors having removable port plates can readily be equipped with a precompression port, positioned in accordance with the foregoing considerations, and with a precompression valve as above described, to provide the benefits of this invention.

From the foregoing it will be seen that we have provided an improved pump/motor which, operated as a pump, establishes fluid precompression, but which, when operated as a motor, automatically decommissions the precompression means. The result is a pump/motor which can operate most effectively as a pump when it is being operated as a pump and which will operate most effectively as a motor when it is being operated as a motor.

While the foregoing constitutes a preferred embodiment of my invention, those skilled in the art will readily comprehend that other types of valves may be utilized to provide controlled communication between the precompression port and the outlet port when the unit is being operated as a motor, and that the principles of the invention are not limited to the embodiment above disclosed, but also include other embodiments and variations within the scope of the claims which follow.

What is claimed is:

1. In a pump/motor device of the axial piston type having a body including means presenting a valve surface, an inlet port and an outlet port spaced therefrom entering on said valve surface, and a rotatable barrel engaging said valve surface and containing reciprocable pistons in cylinders, said cylinders communicating sequentially with said inlet port and said outlet port at the end of said barrel as said barrel is rotated; a precompression port entering on said valve surface and communicating with said cylinders sequentially at a position spaced between said inlet port and outlet port, a valve, a fluid passage in said body between said precompression port and said outlet port including said valve, and pressure responsive means opening said valve when pressure at said inlet port exceeds pressure at said outlet port, said precompression port entering on said valve surface at a position approximately half-way between the angular position of maximum cylinder fluid volume and said outlet port, said precompression port being spaced from said outlet port by a distance greater than the dimension of said cylinder at the end of said barrel.

2. In a pump/motor device of the axial piston type having a body including means presenting a valve surface, an inlet port and an outlet port spaced therefrom each entering on said valve surface, and a rotatable barrel engaging said valve surface and containing reciprocable pistons in cylinders, said cylinders communicating with said inlet and outlet ports sequentially as said barrel is rotated; a precompression port entering on said valve surface at a position spaced between said inlet port and outlet port, said precompression port entering on said valve surface at a position between the angular position of maximum cylinder fluid volume and said outlet port, said cylinders communicating sequentially with said precompression port between said inlet and outlet ports as said barrel is rotated, a valve adapted to be opend by fluid pressure applied to a control surface thereof and urged toward a closed position by yieldable elastic means, a fluid passage between said precompression port and said outlet port and including said valve, said valve closing said passage when said valve is closed, and passage means reflecting pressure at said inlet port onto the said control surface of said valve for opening said valve to establish communication through said body between said precompression and outlet ports.

3. In a pump/motor device of the axial piston type having a body, means presenting a valve surface, an inlet port and an outlet port spaced therefrom entering on said valve surface, and a rotatable barrel engaging said valve surface and containing reciprocable pistons in cylinders, said cylinders communicating sequentially with said inlet port and said outlet port at said valve surface as said barrel is rotated; a precompression port entering on said valve surface and communicating with said cylinders sequentially at a position spaced between said inlet port and outlet port, and means responsive to a pressure differential between said inlet and outlet port to connect said precompression port through said body to said outlet port at all times when pressure at said inlet port exceeds that at said outlet port.

References Cited by the Examiner

UNITED STATES PATENTS

| 2,642,809 | 6/1953 | Born et al. | 103—162 |
| 2,963,983 | 12/1960 | Wiggermann | 103—162 |
| 3,157,130 | 11/1964 | Cadiou | 103—162 |
| 3,179,060 | 4/1965 | Lehrer | 103—162 |
| 3,180,274 | 4/1965 | Sisk | 103—162 |

MARTIN P. SCHWADRON, *Primary Examiner.*

MARK NEWMAN, *Examiner.*

R. M. VARGO, *Assistant Examiner.*